United States Patent [19]

Louderback

[11] Patent Number: 5,058,943
[45] Date of Patent: Oct. 22, 1991

[54] FOLDABLE CANOPY ASSEMBLY FOR MOTORIZED VEHICLES

[75] Inventor: Lawrence E. Louderback, Lansing, Mich.

[73] Assignee: Clyde McKee, Taylor, Mich.

[21] Appl. No.: 477,779

[22] Filed: Feb. 9, 1990

[51] Int. Cl.⁵ .............................................. B60J 7/08
[52] U.S. Cl. ..................................... 296/107; 296/78.1
[58] Field of Search ...................... 296/78.1, 107, 111, 296/114, 124, 208; 114/361

[56] References Cited

U.S. PATENT DOCUMENTS

| | | | |
|---|---|---|---|
| 1,357,239 | 11/1920 | Krok | 296/78.1 |
| 2,000,626 | 5/1935 | Votypka | 296/107 |
| 2,823,684 | 2/1958 | Sartori | 114/361 |
| 4,141,567 | 2/1979 | Scott | 296/78.1 X |
| 4,440,436 | 4/1984 | Giddens et al. | 296/107 |
| 4,681,362 | 7/1987 | Taylor | 296/78.1 |
| 4,770,460 | 9/1988 | Miura et al. | 296/78.1 |

FOREIGN PATENT DOCUMENTS

| | | | |
|---|---|---|---|
| 877432 | 12/1942 | France | 296/107 |
| 1106579 | 12/1955 | France | 296/78.1 |
| 1161930 | 9/1958 | France | 296/78.1 |
| 442544 | 11/1948 | Italy | 296/78.1 |
| 180239 | 12/1935 | Switzerland | 296/78.1 |
| 222424 | 10/1942 | Switzerland | 296/78.1 |
| 3534 | 3/1886 | United Kingdom | 296/107 |
| 192330 | 2/1923 | United Kingdom | 296/78.1 |

Primary Examiner—Margaret A. Focarino
Assistant Examiner—Gary C. Hoge
Attorney, Agent, or Firm—Gifford, Groh, Sprinkle, Patmore and Anderson

[57] ABSTRACT

A convertible top is removably fittable to a motorized vehicle or the like, such as a motorcycle. The top includes several bows, each of which has two ends, each end of each bow is attached to one of two bow support plates thus providing for storage of the bows one atop the other. Side curtains are included, thereby providing an enveloping cover for the passenger area. To prevent billowing of the cover, flow-through ventilation is facilitated.

12 Claims, 3 Drawing Sheets

FOLDABLE CANOPY ASSEMBLY FOR MOTORIZED VEHICLES

BACKGROUND OF THE INVENTION

1. Field of the Invention

The present invention relates generally to convertible tops for motorized vehicles. In particular, the present invention relates to a convertible top for a motorcycle having a number of top bows attached to central bow support brackets and a full canopy and side curtains such that the passenger compartment is completely enveloped.

2. Description of the Prior Art

In a motorcycle or similar motorized vehicle, inclement weather significantly restricts usage. Rain particularly makes motorcycle use unpleasant. Accordingly, it has been desirable to provide a canopy top for a motorcycle or a similar motorized vehicle.

Attempting to fill this need, canopy devices for motorized vehicles have been devised. Such devices include canopies for motorcycles and snowmobiles or the like. In one known embodiment, Taylor, U.S. Pat. No. 4,681,362, a top is disclosed which includes a frame having a main bow pivotally attached to the inside of a top storage container, a second bow pivotally attached to the main bow, and a third bow pivotally attached to the second bow. A canopy fits over the bows and attaches to the top storage container at the rear and, when in the upright position, to the windshield at the front.

In addition to failing to provide for side protection, the bow arrangement of the above-described top fails to provide satisfactory rigidity for the canopy. A further disadvantage is that this device offers no efficient method of allowing flow-through ventilation, thereby resulting in billowing of the canopy and inefficient aerodynamics.

In another reference, Giddens et al., U.S. Pat. No. 4,440,436, a canopy is disclosed for motorcycles and snowmobiles. The top of this attachment includes a primary bow permanently fixed to a vehicle body and a secondary bow fixed to the primary bow. A canopy is fitted to the frame, the front part of which is attached to the windshield.

The disclosure of Giddens fails to include a top which is convertible and collapsible and which includes side protection. A further disadvantage is that such construction fails to provide rigid support for the canopy.

SUMMARY OF THE PRESENT INVENTION

The present invention provides a convertible canopy for a motorcycle or the like which overcomes all of the above-mentioned disadvantages of the previously known canopies.

In brief, convertible top for motorized vehicles including motorcycles or the like of the present invention comprises a frame assembly capable of being selectively folded into either an upright position or a folded position and a canopy fitted thereover.

The frame assembly includes a number of bows and two bow attachment braces attached to the vehicle. Two of the bows wrap around the storage trunk of the vehicle in a substantially horizontal manner and are fixed to the attachment braces. A gap is provided between the storage trunk and the two fixed bows to allow for the bypassage of air. Three pivotable bows are pivotally attached to the bow attachment braces, having substantially the same size and configuration as the two fixed bows.

A canopy is provided which is fitted over the bows, being attached by snaps at the rear by the lowest of the two fixed bows and being fitted at the front, when in the upright position, to the windshield by snap fasteners. An inner trim facing is sewn in the leading edge of the canopy and rests inside the windshield. This placement prevents rain or the like from entering the passenger area.

Side curtains are provided to completely enclose the passenger area when the canopy is in its upright position. The side curtains are provided with handle bar hand closures which allow driver's movement of the handle bar without interference with the side curtains.

To prevent billowing, incoming air enters the passenger area through the gap surrounding the steering fork, passes through the passenger area, and exits through the gap provided between the fixed bows and the trunk.

When not in use, the side curtains are removed and the top is collapsed onto the fixed bows so that the collapsed canopy and frame wraps around the storage trunk. An optional tonneau is fittable over the collapsed canopy and frame to cover the device while stored.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE PREFERRED EMBODIMENT OF THE PRESENT INVENTION

Figure 1:
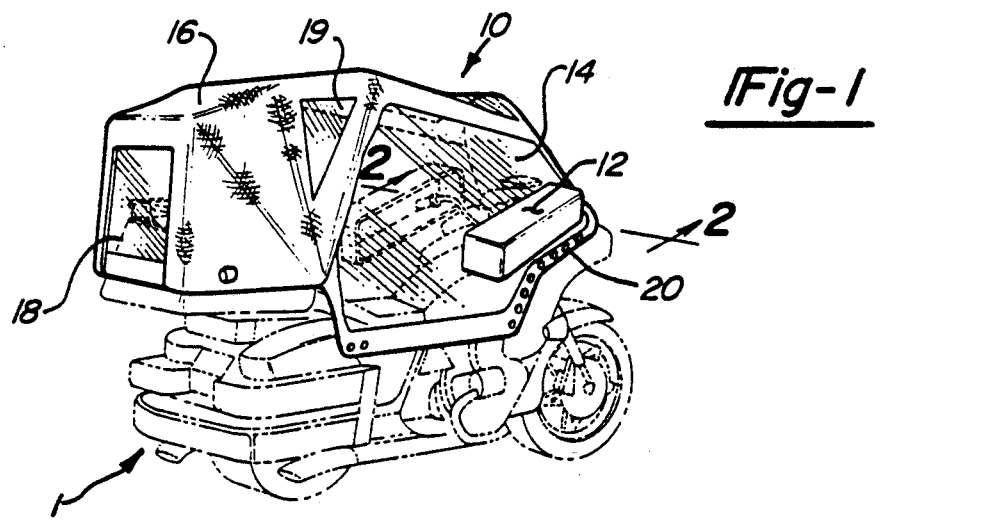
FIG. 1 is a perspective view illustrating a preferred embodiment of the present invention.

With reference first to FIG. 1, the preferred embodiment of the convertible canopy assembly, generally indicated by 10, of the present invention is thereshown fitted to a motorized vehicle, such as a motorcycle indicated generally by 1 and shown in shadow lines. The canopy assembly 10 is shown in its upright position and is fully fitted for driving in inclement weather.

While the motorcycle 1 is shown, the assembly 10 can as well be fitted to other motorized vehicles such as snowmobiles or the like with little or no modification thereof.

The canopy assembly 10 includes a canopy portion 16 which protects the passenger area established therein. The canopy portion 16 is composed of a polymerized material, and is preferably provided with flexible windows. While a variety of windows are conceivable within the scope of the present disclosure, such windows preferably include a rear window 18 and one or more side windows 19.

To fully protect the passengers from rain, dust, snow and cold, side curtains are removably provided. As shown, there is a right side curtain 14 and, although not visible from this view, a left side curtain 14' removably provided on the left side of the motorcycle having substantially the same shape and size as the right side curtain 14.

To provide the driver with maximum comfort and convenience, the side curtain 14 is fitted with a handle bar hand enclosure 12 which provides clearance to accomodate the handle bar handle (not visible) and the driver's hand (not shown). A similar enclosure, handle bar hand enclosure 12' (not visible), is also fitted to the left side curtain 14' (not visible).

The side curtains 14, 14' are removably fitted to the motorcycle 1 by side curtain snaps 20, although it is conceivable that other methods of attachment may be workable.

Figure 2:
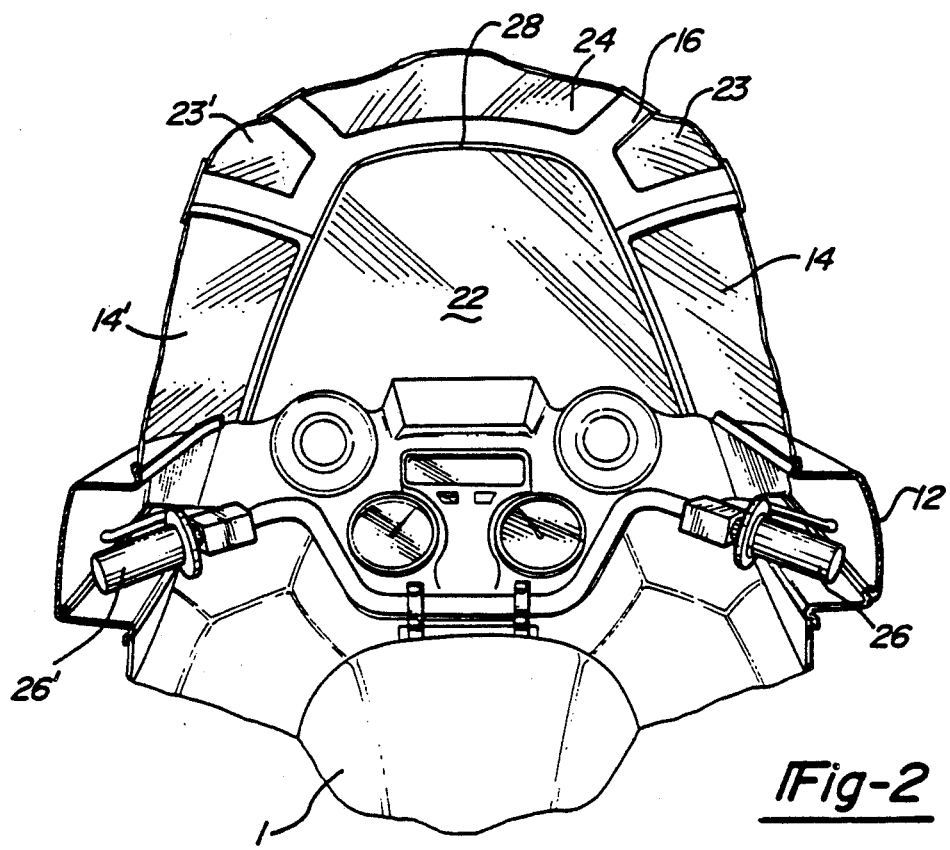
FIG. 2 is a cross-sectional, partial view taken substantially along 2—2 in FIG. 1.

Referring now to FIG. 2, there is shown a cross-sectional, partial view taken substantially along 2—2 in FIG. 1. This view advantageously shows the driver's point of view while seated on the motorcycle 1. The canopy portion 16 is partially shown, and includes a pair of upper side windows 23, 23' and a top window 24. As can easily be seen, a conventional windshield 22 is fitted to the front of motorcycle 1. The canopy portion 16 abuts substantially the upper edge of the windshield 22, the canopy portion 16 being provided with a windshield sealing strip 28. The strip 28 rests upon the inner side of the windshield 22, while the canopy portion 16 extends over the top and toward the front of the windshield 22. This relationship prevents water from slipping over the top of the windshield during operation of the motorcycle 1 and into the passenger compartment.

The right side curtain 14 and the left side curtain 14' are partially shown in this view. The right side curtain 14 is fitted with the right handle bar handle enclosure 12 which allows for clearance of a right handle bar handle 26 and the driver's right hand (not shown). The left side curtain 14' is fitted with the left handle bar handle enclosure 12' which allows for clearance of a left handle bar handle 26' and the driver's left hand (not shown).

Figure 3:
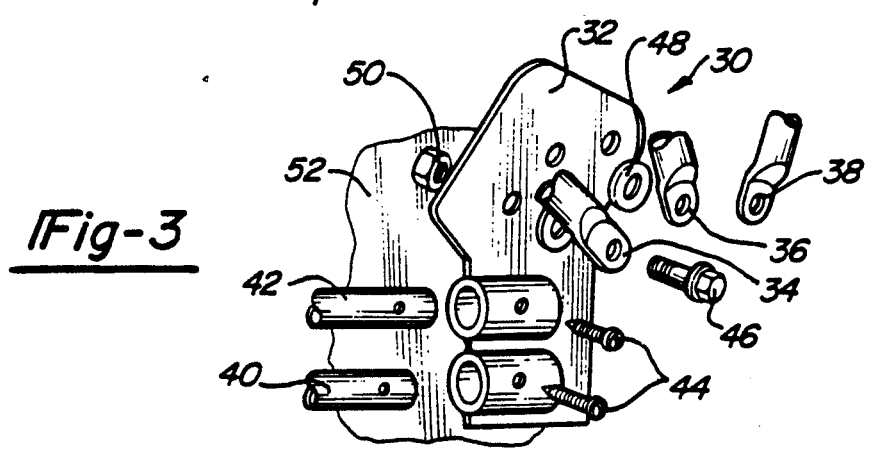
FIG. 3 is an exploded, partial view of the bracket assembly and related components.

With reference to FIG. 3, an exploded, partial view of the right bracket assembly and related components, generally indicated by 30, is shown. The left bracket assembly is not shown, but is substantially identical to the right bracket assembly 30.

The right bracket assembly 30 is selectively mounted at an appropriate place on the motorcycle 1 (not shown). As shown, the assembly 30 is mounted to a storage trunk 52

The bracket assembly includes a bracket plate 32 which is fitted with lower fixed bow socket 41 which receives lower fixed bow 40 and upper fixed bow socket 43 which receives upper fixed bow 42. The fixed bows 40, 42 are held into the fixed bow sockets 41, 43 by means of a pair of screws 44.

A set of pivotable bows are also provided, having substantially the same shape and size as the fixed bows 40, 42. The pivotable bows include a first pivotable bow 34, a second pivotable bow 36, and a third pivotable bow 38. A pivotable bow washer 48 is provided between each pivotable bow 34, 36, 38 to facilitate pivotable movement. The pivotable bows 34, 36, 38 are attached to the bracket plate 32 by means of bolts 46 and nuts 50.

Figure 4:
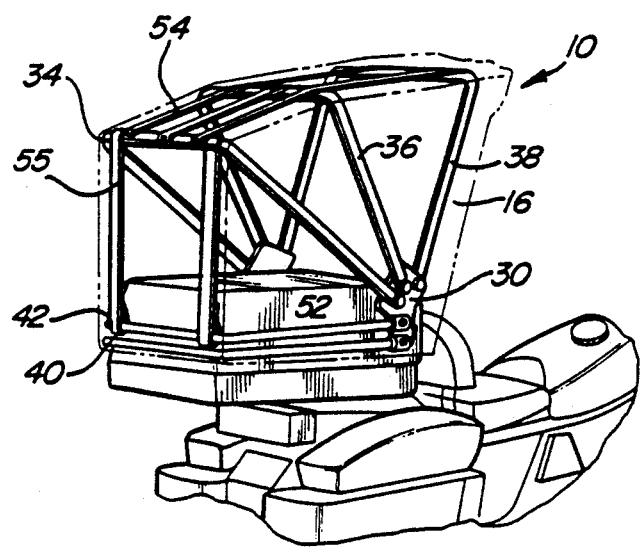
FIG. 4 is a partial, perspective view showing the canopy frame in its upright position and a canopy in shadow lines.
Figure 5:
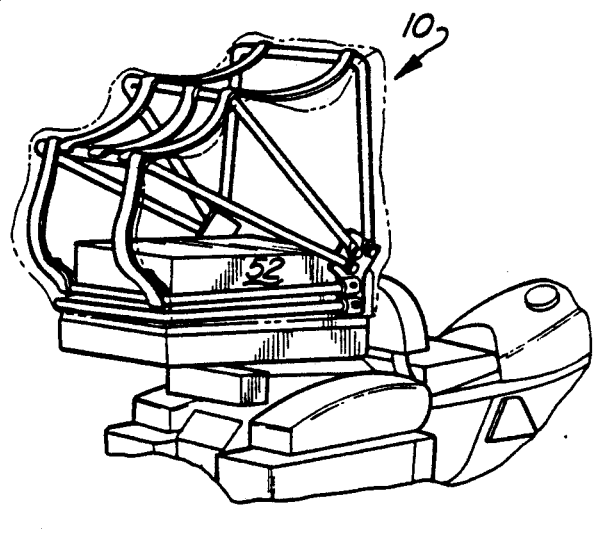
FIG. 5 is a view similar to FIG. 4 but showing the frame and canopy partially collapsed.
Figure 6:
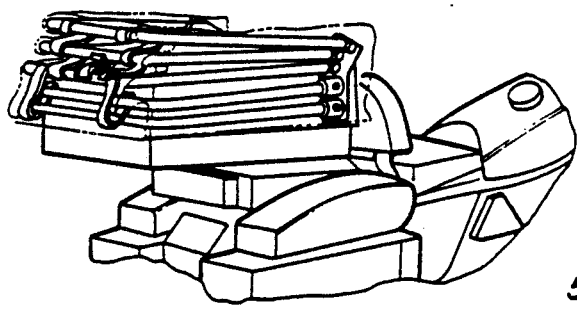
FIG. 6 is a view similar to FIG. 5 but showing the frame and canopy fully collapsed.

With reference to FIGS. 4–6, the frame of the convertible canopy assembly 10 is viewed in its component parts having a canopy portion 16 shown in shadow lines. The assembly 10 is shown in its various possible positions.

Referring to FIG. 4, the assembly 10 is shown in its fully extended upright position. The pivotable bows 34, 36, 38 are attached to one another for support and to maintain the form of the canopy portion 16 by a number of flexible pivotable bow cinch straps 54. The first pivotable bow 34 is likewise attached to the upper fixed bow 42 by means of a pair of flexible back cinch straps 55. The number, shape and placement of the cinch straps 54, 55 can be varied according to need and preference.

Referring to FIG. 5, the convertible canopy assembly 10 is shown in its partially collapsed state. FIG. 6 shows the assembly 10 in its fully collapsed state, positioned about the storage trunk 52 which, while visible in FIGS. 4 and 5, is herein not visible. The bows are shown in FIG. 6 stacked substantially one atop the other.

Figure 7:
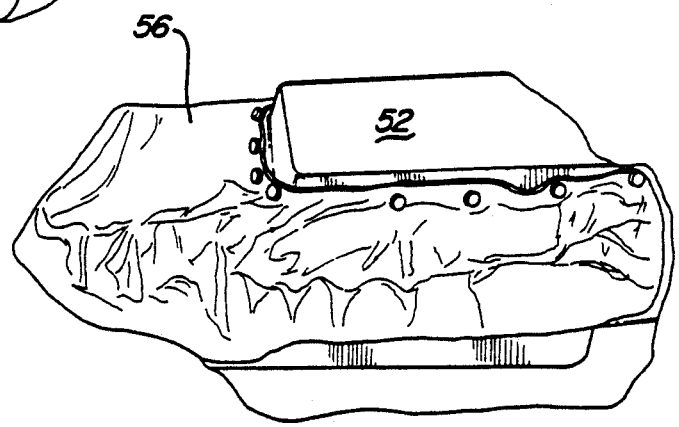
FIG. 7 is a partial, perspective view of the trunk portion of a motorcycle having the present invention substantially attached thereabout and showing the frame and canopy in their collapsed position with a storage tonneau placed thereover.

With reference to FIG. 7, an optional tonneau 56 is shown covering the canopy assembly 10 to protect it from weather and to make the unit more aesthetically pleasing. The tonneau 56 is preferably held to the storage trunk 52 by means of a number of tonneau snaps 58.

Figure 8:
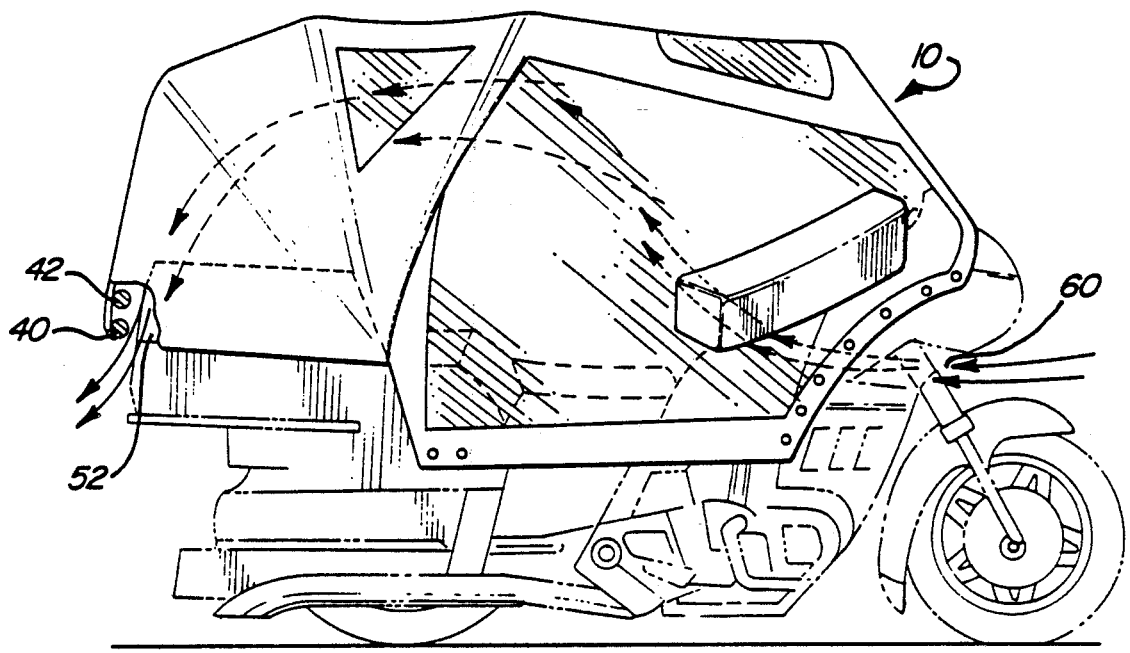
FIG. 8 is a side view of the frame and canopy in their upright position and attached to a motorcycle shown in shadow lines and illustrating the flow of air into, through, and out of the passenger compartment.

With reference to FIG. 8, a side view of the canopy assembly 10 fitted to the motorcycle 1 is shown. The arrows indicate the direction of air entering into the passenger area within the canopy assembly 10 through the fork post opening 60 and exiting through the back of the assembly 10 by means of the passage provided between the fixed bows 40, 42 and the trunk 52. By providing for such through-passage of air, billowing of the assembly 10 is thereby prevented when the driver is underway on the road.

Figure 9:
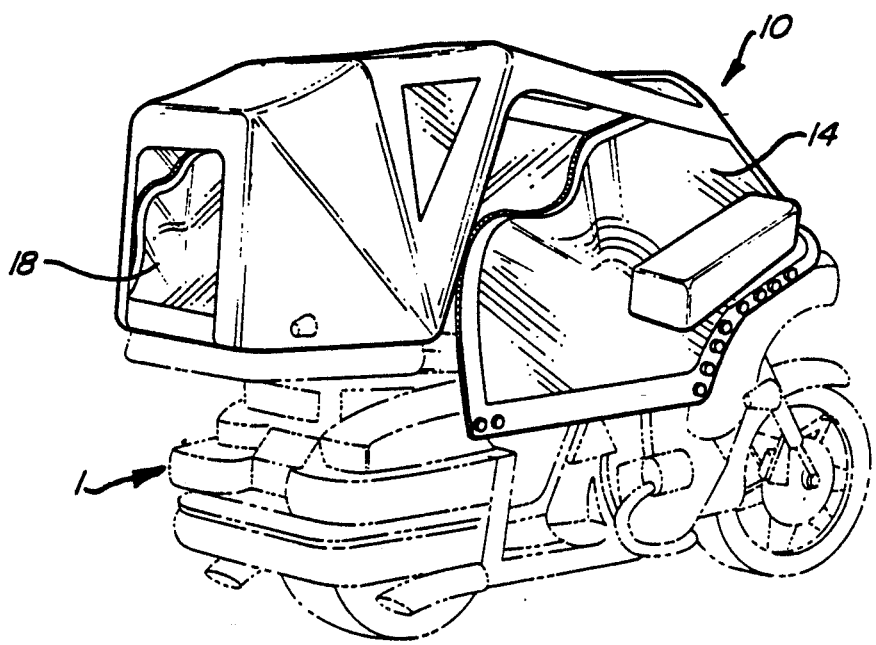
FIG. 9 is a perspective view showing the apparatus of the present invention fitted to a motorcycle shown in shadow lines and further having one side curtain partially removed.

With reference finally to FIG. 9, a perspective view of the canopy assembly 10 in place on the motorcycle 1 is shown. The rear window 18 may also be used as access to the storage trunk 52 (not shown). This view reveals how the rear window 18 may be opened for ventilation and further illustrates the partially opened right side curtain 14. Preferably, the right side curtain 14 unzips beginning at below a right saddle bag 62 and moving toward the upper part of the windshield 22 (not shown). Preferably, the left side curtain 14' (not shown) unzips in the opposite direction.

Having described the invention, however, many modifications thereto will become apparent to those skilled in the art to which it pertains without deviation from the spirit of the invention as defined by the scope of the appended claims.

I claim:

1. A foldable canopy assembly for motorized vehicles having a trunk comprising:
   a foldable frame portion having at least one pivotable bow and an upper and a lower fixed bow;

a cover portion removably fitted to said foldable frame portion;

said cover portion having a top and sides;

said foldable frame portion having said cover portion fitted thereon being reversibly foldable from an upright covering position to a collapsed storage position, said foldable frame portion having said cover portion fitted thereon when in said upright covering position, substantially forming and enveloping an inner passenger compartment;

opposing fixed bracket assemblies mounted to said storage trunk on said motorized vehicle;

said at least one pivotable bow, and said upper and lower fixed bows being secured to said opposing fixed bracket assemblies; and said opposing fixed bracket assemblies further comprising upper and lower fixed bow sockets for receiving said upper and lower fixed bows, said upper and lower fixed bows being longitudinally inserted into said upper and lower fixed bow sockets.

2. A foldable canopy assembly according to claim 1, said canopy assembly having an exhaust air passageway defined between a selected rear portion of said motorized vehicle and selected ones of said upper and lower fixed bows.

3. A foldable canopy assembly according to claim 1, said sides being provided with an enclosure surrounding right and left handle bar handles.

4. A foldable canopy assembly according to claim 1, said bows forming three consecutively perpendicular sides and being substantially of equivalent size.

5. A foldable canopy assembly according to claim 1, wherein said at least one pivotable bow further comprises first, second and third pivotable bows.

6. A foldable canopy assembly according to claim 1, said bracket assemblies further comprising pivotable bow washers and nut and bolt assemblies for permitting pivotable motion of said first, second and third pivotable bows.

7. A foldable canopy assembly according to claim 1, wherein said canopy is composed of a polymerized material.

8. A foldable canopy assembly according to claim 7 wherein said canopy further comprises right and left side curtains, said curtains being removably fitted to said motorized vehicle by side curtain snaps.

9. A foldable canopy assembly according to claim 7, wherein said canopy further comprises rear, side, and upper side windows formed into said cover portion.

10. A foldable canopy assembly according to claim 7, wherein said canopy abuts an upper edge of said motorized vehicle, said canopy further being lined with a windshield sealing strip for sealingly engaging said windshield.

11. A foldable canopy assembly according to claim 7, said collapsed assembly being covered by a tonneau, said tonneau being held to said storage tank by a number of tonneau snaps.

12. A foldable canopy assembly according to claim 7, said pivotable bows being supported in an extended position by a number of cinch straps.

* * * * *